(12) United States Patent
Stamos et al.

(10) Patent No.: US 7,409,547 B2
(45) Date of Patent: *Aug. 5, 2008

(54) ADAPTIVE TRANSPARENT ENCRYPTION

(75) Inventors: Nicholas Stamos, Belmont, MA (US);
Donato Buccella, Watertown, MA (US);
Dwayne A. Carson, Mendon, MA (US)

(73) Assignee: Verdasys, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/510,891

(22) Filed: Aug. 28, 2006

(65) Prior Publication Data

US 2006/0294373 A1    Dec. 28, 2006

Related U.S. Application Data

(63) Continuation of application No. 10/750,321, filed on Dec. 31, 2003, now Pat. No. 7,100,047.

(60) Provisional application No. 60/442,464, filed on Jan. 23, 2003.

(51) Int. Cl.
*H04L 9/00* (2006.01)
*G06F 12/14* (2006.01)

(52) U.S. Cl. .................. 713/165; 713/164; 713/167; 726/30; 726/27; 726/3; 726/1; 709/246; 705/51

(58) Field of Classification Search .................. 713/165
See application file for complete search history.

(56) References Cited

U.S. PATENT DOCUMENTS

| | | | |
|---|---|---|---|
| 5,032,979 | A | 7/1991 | Hecht et al. |
| 5,666,411 | A | 9/1997 | McCarty |
| 6,427,140 | B1 | 7/2002 | Ginter et al. |
| 6,510,513 | B1 | 1/2003 | Danieli |
| 6,990,513 | B2 | 1/2006 | Belfiore et al. |
| 7,100,047 | B2 * | 8/2006 | Stamos et al. ............... 713/165 |
| 2001/0042043 | A1 | 11/2001 | Shear et al. |
| 2002/0178271 | A1 | 11/2002 | Graham et al. |
| 2003/0051026 | A1 | 3/2003 | Carter et al. |
| 2003/0120935 | A1 | 6/2003 | Teal et al. |
| 2003/0145235 | A1 | 7/2003 | Choo |

(Continued)

OTHER PUBLICATIONS

Reid, Jason F., et al, 'DRM, Trusted Computing and Operating System Architecture', 2005, Information Security Research Centre, Queensland Univer. of Technology, entire document, 'http://crpit.com/confpapers/CRPITV44Reid.pdf'.*

(Continued)

*Primary Examiner*—Kristine Kincaid
*Assistant Examiner*—Ronald Baum
(74) *Attorney, Agent, or Firm*—Hamilton, Brook, Smith & Reynolds, P.C.

(57) ABSTRACT

A technique for adaptive encryption of digital assets such as computer files. The system model monitors passage of files to uncontrollable removable storage media or through network connections and the like which may indicate possible abuse of access rights. In accordance with a preferred embodiment, an autonomous independent agent process running at a point of use, such a background process in a client operating system kernel, interrupts requests for access to resources. The agent process senses low level system events, filters, and aggregates them. A policy engine analyzes sequences of aggregate events to determine when to apply encryption.

20 Claims, 12 Drawing Sheets

U.S. PATENT DOCUMENTS

2004/0054894 A1* 3/2004 Lambert .................... 713/165
2004/0255160 A1  12/2004 Stamos et al.
2005/0060537 A1   3/2005 Stamos et al.

OTHER PUBLICATIONS

Kirichenko, A., "F-Secure Kernel Mode Cryptographic Driver, FIPS 140-2 Validation Security Policy," F-Secure Corp., Dec. 2001 entire document, cs-www.ncsi.nist.gov/cryptval/140-1/140sp/140sp237.pdf.

Reid, Jason F., et al., DRM, Trusted Computing and Operating System Architecture, 2005, Information Security Research Centre, Queensland Univer. of Technology, entire document, 'http://crpit.com/confpapers/CRPITV44Reid.pdf'.

* cited by examiner

| Action Type | Level | Event Category | Event Name | Event Table | Action Detail Field | Action Detail Value | Discriminant |
|---|---|---|---|---|---|---|---|
| 1 | Low | File | FileRead | FileEvent | operationType | 0 | bytesRead > 0, bytesWritten = 0 |
| 2 | Low | File | FileWrite | FileEvent | operationType | 0 | bytesRead = 0, bytesWritten > 0 |
| 3 | Low | File | FileReadWrite | FileEvent | operationType | 0 | bytesRead > 0, bytesWritten > 0 |
| 4 | Low | File | FileCopy | FileEvent | operationType | 1 | |
| 5 | Low | File | FileRename | FileEvent | operationType | 2 | |
| 6 | Low | File | FileDelete | FileEvent | operationType | 3 | |
| 7 | Low | File | FileMove | FileEvent | operationType | 4 | |
| 8 | Low | File | FileRecycle | FileEvent | operationType | 5 | |
| 9 | Low | File | FileRestore | FileEvent | operationType | 6 | |
| 10 | Low | Network | TCPIPInbound | NetworkEvent | protocolType | TCPIP | isOutbound = 0 |
| 11 | Low | Network | TCPIPOutbound | NetworkEvent | protocolType | TCPIP | isOutbound = 1 |
| 12 | Low | Network | UDPInbound | NetworkEvent | protocolType | UDP | isOutbound = 0 |
| 13 | Low | Network | UDPOutbound | NetworkEvent | protocolType | UDP | isOutbound = 1 |
| 14 | Low | Network | IPSECInbound | NetworkEvent | protocolType | IPSEC | isOutbound = 0 |
| 15 | Low | Network | IPSECOutbound | NetworkEvent | protocolType | IPSEC | isOutbound = 1 |
| 16 | Low | Print | Print | PrintEvent | (implied) | N/A | |
| 17 | Low | CD | CDRead | CDEvent | operationType | 1 | |
| 18 | Low | CD | CDWrite | CDEvent | operationType | 2 | |
| 19 | Low | Clipboard | ClipboardCutCopy | ClipboardEvent | eventType | CutCopy | |
| 20 | Low | Clipboard | ClipboardPaste | ClipboardEvent | eventType | Paste | |
| 21 | Low | User | UserLogon | UserEvent | eventType | Logon | |
| 22 | Low | User | UserLogoff | UserEvent | eventType | Logoff | |
| 23 | Low | Machine | Machine | MachineEvent | eventType | ... | Skip the Machine events |

FIG. 4A

| | | | ProcessStart | Process | | Use processStartDtTm |
| --- | --- | --- | --- | --- | --- | --- |
| | | | ProcessEnd | Process | | Use processEndDtTime |
| 24 | Low | Process | | | (Implied) | |
| 25 | Low | Process | | | (Implied) | |
| 26 | High | File | FileEdited | AggregateEvent | | |
| 27 | High | File | FileCopied | AggregateEvent | | |
| 28 | High | File | FileSaveAs | AggregateEvent | | |
| 29 | High | File | FileLeftThroughRemovableMedia | AggregateEvent | | |
| 30 | High | Clipboard | ClipboardToFile | AggregateEvent | | |
| 31 | High | Print | PrintFile | AggregateEvent | | |
| 32 | High | CD | BurnMaster | AggregateEvent | | |
| 33 | High | CD | BurnFile | AggregateEvent | | |
| 34 | High | Network | FileLeftThroughNetworkPort | AggregateEvent | | |
| 35 | High | Network | EmailFile | AggregateEvent | | |
| 36 | High | Network | RemoteAccess | AggregateEvent | | |
| 37 | High | Network | InstantMessenger | AggregateEvent | | |
| 38 | High | Network | P2PApp | AggregateEvent | | |
| 39 | High | Network | FTPFile | AggregateEvent | | |
| 40 | High | Network | TunnelOut | AggregateEvent | | |
| 41 | High | Network | TunnelIn | AggregateEvent | | |
| 42 | High | Network | TunnelInOut | AggregateEvent | | |
| 43 | High | Network | FileOutThroughTunnel | AggregateEvent | | |

FIG. 4B

| Event Name | Constituent Event Types | Pattern | Scope |
|---|---|---|---|
| FileEdited | FileRead, FileWrite, FileReadWrite | Same processid and fileHandle. beforeHash of first read & afterHash of last write differ. Both reads and writes to same fileHandle. Sum of writes > 0. | Thread |
| FileCopied | FileRead, FileWrite, FileReadWrite, FileCopy | Command shell: Alternating reads & writes. The reads all have one filehandle, the writes all have a second one.<br><br>Explorer: A long series of reads from one filehandle followed by a long series of writes to a second. Mind the time period between.<br><br>In both cases, the target device must not be removable. | Thread |
| FileSaveAs | FileRead, FileWrite, FileReadWrite | An app reads one or more files then writes a file. | Process |
| FileLeftThroughRemovableMedia | FileRead, FileWrite, FileReadWrite, FileCopy | Same as FileCopied or FileSaveAs, but target device is removable. | Process |
| ClipboardToFile | ClipboardCutCopy, ClipboardPaste | Pair a ClipboardCutCopy with all subsequent Clipboard Paste events for that user login until the next copy or the user logs out.<br><br>Problem: If the user closes the application that performed the copy and the object was large and the user opts not to keep it there, what happens? | Login |

FIG. 5A

| | | | |
|---|---|---|---|
| PrintFile | Print, possibly others | Unclear. If there are temp files, intermediate PDF files, etc. then we may perform a chain of custody analysis to figure out just what was printed. | Thread |
| BurnMaster | FileRead, FileWrite | An app known to burn files reads one or more files then writes a file. | Process |
| BurnFile | CDWrite, FileRead | Application is recognized as a CD writing app. (Optional)<br><br>Series of FileReads from one fileHandle, followed by a series of CDWrite events with the same process. May need to compare filenames, otherwise one read will exhaust all the writes. Alternately, all read files are lumped together with one large burn event. Or perhaps the first read of a new file after the last read from the previous file is the start of the next burn event. | Process |
| FileLeftThroughNetworkPort | FileRead,<br>TCPIPInbound, TCPIPOutbound,<br>UDPInbound, UDPOutbound,<br>IPSECInbound, IPSECOutbound | An overlapping stream of FileReads interspersed with Inbound and Outbound network events.<br><br>All the network events should be for the same port (?) and to a destination NOT on localhost.<br><br>All the network events should be for the same protocol. | Thread |
| EMailFile | FileRead,<br>TCPIPInbound, TCPIPOutbound,<br>(other protocols???) | Similar to FileLeftThroughNetworkPort. Combines all interleaving FileReads with the network events.<br>The application image name is one of those known to be an email program.<br>May place constraints on the ports, since many emailers use certain well defined ports for SMTP, POP, etc. | Process |

FIG. 5B

| | | |
|---|---|---|
| InstantMessenger | FileRead, TCPIPInbound, TCPIPOutbound, (other protocols???) | Similar to FileLeftThroughNetworkPort. Combines all interleaving FileReads with the network events.<br><br>The application image name is one of those known to be used for instant Messanger.<br><br>May place constraints on the ports. | Process |
| P2PApp | FileRead, TCPIPInbound, TCPIPOutbound, UDPInbound, UDPOutbound, IPSECInbound, IPSECOutbound | Constrain the application name to be one of those known to be a P2PApp.<br><br>Multiple ports will be used; some or all of them may have constraints. May constrain the protocol per app or per instance.<br><br>Similar to FileLeftThroughNetworkPort as concerns interleaved file reads. | Process |
| FTPFile | FileRead, FileWrite, ??? (TCPIPInbound, TCPIPOutbound | May want to split into two events, one for reading and one for writing.<br><br>Constrain to the common FTP port, unless the app is known by name to be an FTP client.<br><br>Like FileLeftThroughNetworkPort, look for interleaved reads and network events, or interleaved writes and network events. | Process |
| RemoteAccess | TCPIPInbound, TCPIPOutbound, UDPInbound, UDPOutbound, IPSECInbound, IPSECOutbound | Do not incorporate FileRead events.<br>Several ports may be used.<br>Look for known image names of remote apps. | Process |

FIG. 5C

| | | | |
|---|---|---|---|
| TunnelOut | TCPIPInbound, TCPIPOutbound, UDPInbound, UDPOutbound, IPSECInbound, IPSECOutbound | All events use same protocol. Only two processes used. Two different apps and four ports are used. One of the ports is remote.<br>Event 1: The first app sends outbound from local port 1 to local port 2.<br>Event 2: The second app (the tunneler) receives inbound from local port 1 to local port 2.<br>Event 3: The tunneler also sends from local port 3 to remote port 4. Both events of the tunneler share the same thread (probably). | Login |
| TunnelIn | TCPIPInbound, TCPIPOutbound, UDPInbound, UDPOutbound, IPSECInbound, IPSECOutbound | All events use same protocol. Only two processes used. Two different apps and four ports are used. one of the ports is remote.<br>Event 1: The first app (the tunneler) receives inbound from remote port 1 to local port 2.<br>Event 2: The tunneler sends outbound from local port 2 to local port 3.<br>Event 3: The second app also receives inbound from local port 3 to local port 4.<br>Both events of the tunneler share the same thread (probably). | Login |
| TunnelInOut | TCPIPInbound, TCPIPOutbound, UDPInbound, UDPOutbound, IPSECInbound, IPSECOutbound | Multiple protocols may be used. More research needed. More than three ports are used. | Login |
| FileLeftThroughTunnel | FileRead, TunnelOut | Similar to FileLeftThroughNetworkPort. Combines all interleaving FileReads involving a process that is participating in a TunnelOut event.<br>If more than one file is read, the source destination will be a count of the files read. | Login? |

FIG. 5D

ADAPTIVE TRANSPARENT ENCRYPTION

RELATED APPLICATIONS

This application is a continuation of U.S. application Ser. No. 10/750,321, filed Dec. 31, 2003, now U.S. Pat. No. 7,100,047 which claims the benefit of U.S. Provisional Application No. 60/442,464 entitled "Method and System for Adaptive Identification and Protection of Proprietary Electronic Information," filed on Jan. 23, 2003. This application is also related to a U.S. patent application entitled "Managed Distribution of Digital Assets", Ser. No. 10/706,871 filed Nov. 12, 2003, and is also related to U.S. patent application entitled "Digital Asset Usage Accountability Via Event Journaling" Ser. No. 10/716,336 filed Nov. 18, 2003. The entire teachings of the above applications are incorporated herein by reference.

BACKGROUND OF THE INVENTION

Inexpensive and ubiquitous access to the Internet, websites, extranets and intranets have revolutionized the way that most reorganizations communicate and do business with one another. Information of all types now flows much more freely and is far more available. However the ease of access to these network-centric information resources also threatens the security of any system connect to it. By implication, almost all sensitive data in an enterprise is now at risk of exposure, since placing information on line means losing at least some measure of control over it.

Security continues to be a significant issue facing data processing system administrators. It is now almost a certainty that the most valuable assets of a company, its intellectual property, will be stored in some manner in digital form. These digital assets can include documents of many types, such as product plans and designs, customer data, customer and vendor correspondence, contract terms, financial data, regulatory compliance data, custom software applications and the like.

Further complicating matters is the fact that the managers at the highest level of responsibility in organizations, including even Chief Executive Officers and Directors, are now held legally and financially accountable by regulators and shareholders alike for maintaining the confidentiality, security and integrity of sensitive information.

Many different solutions already exist to protect an organization's data processing infrastructure from certain outsider threats. These include physical access control, firewalls, sniffers and other network monitors, intrusion detection systems and other solutions. These techniques can be effective against attacks by unauthorized outsiders in most instances.

However, there is a second class of computer users that also pose a security threat. Protection from these unauthorized insiders requires a different approach, but one that is also well known. Almost since the inception of disk-based storage systems, the concept of access control has been applied to limit the ability of certain users to access certain important files. Using these techniques, now a universal feature of almost every Operating System (OS), a desktop and/or network file server can provide for limited read, write, public, private and other types of access to files, directory structures and the like, depending upon permissions granted to particular users. Permissions can be attached to user accounts by a system administrator, based on the need to know, the departments in an organization of which a user is a member, and so forth.

Even when users obtain access to only a portion of a system, however, they can still use a variety of techniques to steal and/or damage information. These can include simple browsing for unsecured information in a network, and/or removal or deletion of information made available as a result of poor security practices. More sophisticated rogue insiders will employ network packet sniffers and/or spying software.

Encryption techniques such as those employing a Public Key Infrastructure (PKI) enable an enterprise to provide authentication, access control and confidentiality for its applications and data. PKI systems can be used to protect the security of e-mail and other communications, business transactions with customers, as well as to protect data stored on network servers. PKIs typically require the issuance and tracking of digital certificates, certificate authorities, and public key cryptography elements in an enterprise wide network.

A variety of PKI-based approaches couple centralized document storage with so-called Digital Rights Management (DRM) tools to provide some measure of control over digital assets. In these systems, a policy enforcement process running on a file server, or even on a separate policy server, enforces encryption policies on file usage. In such systems, access to files on the file server is controlled first by the policy server, which uses centrally managed keys for encryption. The policy server is not itself responsible for storing and retrieving information, but is typically responsible for keeping lists of access policies (i.e., which users are authorized to access which types of documents), managing user authentication, securing client-to-server communication, and distributing encryption keys. Before accessing any information, the recipient must first authenticate with the policy server. The policy sever then issues copies of required keys to permit the recipient to decrypt the information.

For example, U.S. Pat. No. 6,510,513 issued to Danieli and assigned to Microsoft Corporation describes a security and policy enforcement system that utilizes a series of transactions between a server and a client using electronic security certificates. A first client generates a request for access to data by submitting a security certificate containing a digest to a trusted arbitrator server. The trusted arbitrator authenticates the first client's credentials and returns the security certificate. The data and security certificate are then combined to create a distribution, which, in turn, is acquired by a second client. The second client extracts the security certificate and generates a digest from the data in the distribution. If the digest from the second client matches the digest from the first client, then data is considered to be valid. Depending upon the certificate type and a policy level, the trusted arbitrator server can provide services such as notification of improper usage.

SUMMARY OF THE INVENTION

While DRM systems thus hide many of the complexities of protecting information from end users, they are not without their shortcomings. A DRM server introduces new management issues into an information technology environment by creating the need to issue and track digital certificates, access authorities, encryption keys, and other PKI infrastructure elements. Maintaining this overhead can become cumbersome, even in small enterprises, which may have thousands if not millions of documents, and dozens of different security policies.

Existing DRM server systems also typically impose additional overhead every time that a document stored on a file server is accessed. Before a file can be used, its associated access policy must be located, user authentication obtained, the appropriate keys identified, and decryption algorithms applied. This overhead work on the server is imposed even for files which are not particularly sensitive.

For example, finance department files associated with a pending corporate merger proposal are typically given a high security classification and should always be encrypted. However, other documents such as a schedule for the company's summer picnic are not particularly sensitive, and should not be subjected to the overhead of elaborate DRM schemes. A better solution would be to selectively encrypt only those documents which truly need to be encrypted, determined at the point of use according to established policies rather than ad hoc, and in a way that is transparent to the end user.

An improved approach would implement encryption policies, not just by determining the sensitivity of the information stored in a document, but also depending upon a proposed action to be taken with it. For example, if the action to be taken is to access a sensitive document for editing and then storing the edited copy back on the same secure local file server from which it was retrieved, an adequate policy for some organizations might impose no encryption requirement at all. However, when even a less sensitive document is to be sent via a web-based e-mail service outside of that same organization, say even a schedule for the company picnic, that document may need to be encrypted as its destination is not controllable.

Neither do existing DRM solutions do much to protect misuse of information by authorized insiders. This class of users has a trusted status, as they are supposed to have access to important data files to carry out their assigned tasks. Thus, they are routinely granted permission to use such information on a daily basis. Their access to sensitive data therefore is not normally suspect. The problem comes when this class of trusted users abuse that trust—by copying and then distributing sensitive information to outsiders or other unauthorized people. Such events can happen quite easily, and has been occurring with increasing frequency when a disgruntled or departing employee wishes to damage an organization.

What prior art security systems fails to account for is the fact that once granted access to sensitive information, it is quite easy for authorized users to distribute it in many different ways. The proliferation of Internet connections, e-mail, instant messaging, removable media storage devices, such as Compact Disk-Read Write (CD-RW) drives, Universal Serial Bus (USB) type memory and storage devices, and the like, make it a trivial task to copy vast amounts of information almost instantaneously. Other peripheral devices, such as wireless modems, wireless local network cards, portable computers, Personal Digital Assistants (PDAs), network tunnels, and the like, provide all too convenient vehicles by which an authorized user may distribute copies of files outside of the trusted system environment.

Even the most sophisticated file management systems cannot presently prevent such abuse. The root of the problem stems from the fact that once an authorized user opens a file, its contents are no longer controllable. Specifically, copies of the file contents may be taken "out of" the controlled environment of a network or file management system all too easily.

The present invention is intended to address security problems that originate when authorized users abuse their authority. The invention accomplishes this by selectively applying encryption policies at the point of use of a file, rather than simply at the point of file server and/or access storage.

More specifically, an autonomous, independent agent process, such as running in the background of a client Operating System (OS) kernel, interrupts requests for access to resources. Such resource access requests may include, for example, requests to read a file, open a network connection, mount a removable media device, and the like. Since access is detected at the point of use, in the OS kernel interrupt mechanism, tracking of resource utilization will occur regardless of whether the original directly access request originated from an application program that is being executed by an end user, indirectly by applications on behalf of users, or even by system requests made independently of application software.

The autonomous independent agent process detects requests for access to resources using sensors that capture low level system events. These sensors may include operations such as file read, file write, file copy, clipboard cut, clipboard copy, CD-RW access, TCP/IP network message inbound, TCP/IP network message outbound and the like.

For example, an aggregate "FileEdit" event might be reported when a user has opened and modified a sensitive financial document, with that user then attempting to save it to a newly attached USB portable hard drive.

Other aggregate events can then be defined whenever users attempt access to files, applications, networks and peripheral bus interfaces. Such aggregate events are typically defined by a system administrator to actively enforce policies governing the acceptable use of system resources.

Enforcement of adaptive encryption policies can then take place at the time and place of information access, via the agent process. For example, the system administrator may wish to control the adaptive application of encryption to sensitive documents depending upon the requested action with the document. One such example policy may be to apply encryption any time that a document is to be stored on a removable media peripheral device such as Universal Serial Bus (USB) hard disk drives, or Compact Disk-Read Write (CD-RW) burners, or when a document is to be sent over a network connection such as through an Instant Messaging (IM) application or File Transfer Protocol (FTP) or other peer-to-peer network connections.

Encryption policies governing the use of these resources can be as detailed as required by the organization. For example, encryption may not be required for even a sensitive document that is to be edited and then saved on a controlled internal file server. However, even relatively low sensitive documents may be encrypted whenever an attempt is made to move them outside of the organization. The file then travels over unsecured networks and/or to untrusted outsiders in encrypted form.

The agent process also assists with implementing encryption policies in other ways. For example, an authorized user on the receiving end of an e-mail message or file transfer will thus receive a controlled file in encrypted form. However, an authorized recipient will also preferably have an autonomous independent agent process running in its own OS kernel. Upon receiving such a file that has been encrypted (such as determined by checking a file header), the receiving agent can then apply the organization's encryption policies using access to a PKI afforded through an associated policy server at the destination. This process also occurs within the OS kernel of the destination machine, again in a manner that is transparent to the end user.

Thus, if the receipting is authorized, the document will be decrypted by the agent process. If the recipient is not authorized, the agent process will not decrypt the document. Of course, a recipient that does not have the agent process running at all will also not be able to decrypt the document.

The autonomous, disconnected, transparent operation of encryption also eliminates potential problems with false positives. In other words, if the agent process has applied encryption policy too aggressively at the source, by encrypting a document that should not have been encrypted, at least the agent process at the destination will decrypt the document in a way that is transparent to the end users.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 4A-4B are a table of possible low level atomic events.

FIGS. 5A-5D are a table of higher level aggregate events.

DETAILED DESCRIPTION OF THE INVENTION

A description of preferred embodiments of the invention follows.

Figure 1:
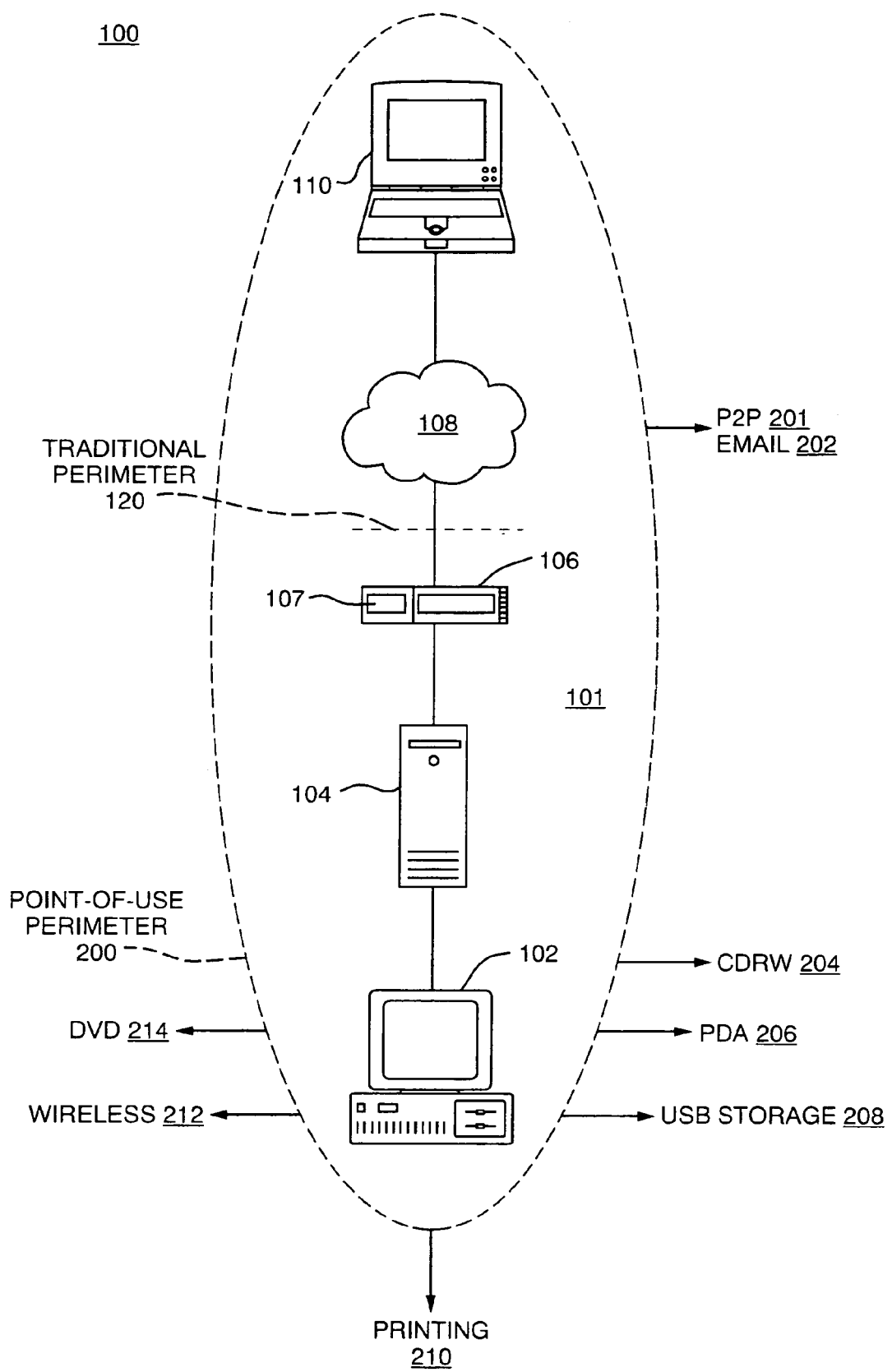
FIG. 1 is a diagram illustrating traditional security perimeters in a data processing system and a point of use encryption policy perimeter that can be implemented with the present invention.

FIG. 1 is a diagram of a typical computer network 100 which consists of client devices 102 and servers 104 connected via local area network and/or inter-networking equipment. Connections to an outside network, such as the Internet 108, are made through devices such as routers or gateways 106. Connections through the Internet 108 can be also made to external computers 110.

Traditional security models attempt to prevent access by an untrusted outsider 110 to devices 102 and/or file servers 104 within the protected network 100. Thus, a network perimeter 120 is typically associated with network points of access, such as through router 106 and specifically at a firewall 107. The firewall 107 can thus prevent attempts by unauthorized users of outside computers 110 to access information stored in the server 104 or otherwise manipulate the local computers 102. Firewalls 107 can also establish a perimeter 120 for outgoing access such as, for example, by users attempting to access certain undesirable outside computers 110 that contain restricted or harmful websites, game servers, and the like.

Rather than establishing a perimeter at external points of physical access to a network, the present invention establishes a perimeter of accountability for file usage at the point of use. The accountability model can not only track authorized users of the computer 102 accessing files stored on a local server 104, but more importantly also monitors attempts to access or move such files to peripherals that distribute or record information, or other possible abuse events.

Upon detecting a possible abuse event, an encryption policy is selectively applied, depending upon the sensitivity of the document as well as the attempted action with the document.

Such possible abuse events may occur whenever a user accesses devices which are not visible to or controllable by a local file server 104 or firewall 107. These events may include writing files to uncontrolled media such as Compact Disk-Read Write (CD-RW) drives 204, Personal Digital Assistants (PDA) 206, Universal Serial Bus (USB) storage devices 208, wireless devices 212, digital video recorders 214, or even printing of files. Other suspect events can include running external Peer-to-Peer (P2P) applications 201, sending files via external e-mail applications 202, running Instant Messaging (IM) applications, uploading files to web sites via the Internet 108, and the like.

As will be understood shortly, the heart of this approach consists of a high level contextual stream that characterizes user activity as it occurs at the point of use, such as the desktop 102, and then adaptively applies encryption according to defined policies.

Figure 2:
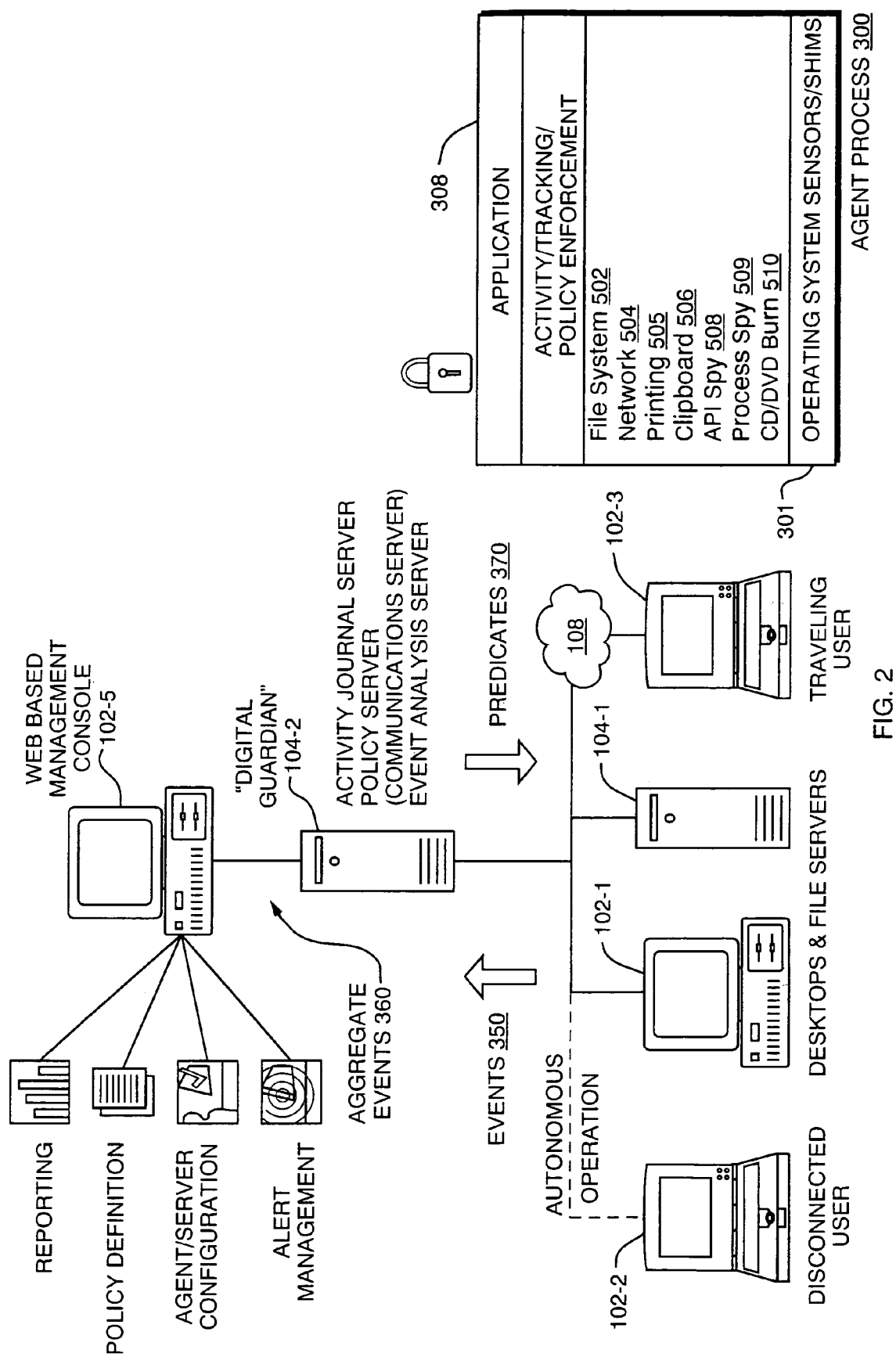
FIG. 2 is a diagram illustrating how a Digital Guardian™ server may provide policy predicates. (Digital Guardian™ is a trademark of VerdaSys, Inc., of Waltham, Mass.)

Turning attention to FIG. 2, the process for adaptive encryption of digital assets will now be described in more detail. A first system component, called an agent process 300, is interposed between an Operating System (OS) 301 and applications 308 as they run on clients 102 and/or servers 104 within the network 101. The agent process 300 has sensors or shims to detect and track file, printing, clipboard, and I/O device operations, such as file read or write operations. These sensors may include, but are not limited to, file system sensor 502 (including CD/DVD burn sensor 510), network sensor 504, print sensor 505, clipboard sensor 506, API spy 508 and process spy 509.

While the clients normally include desktops 102-1 which have a direct wired (or wireless) connection 109 to the local network 101, the agent 300 may also run on disconnected client computers such as laptops 102-2, making a report of events once a connection is eventually made to the network 100.

The agent 300 reports atomic events 350 to an activity journaling process typically running on an activity journaling server 104-2. The journaling server 104-2 (also referred to herein as the Digital Guardian™) processes atomic event data and coalesces it into what are called aggregate events 360. Aggregate events 360 are detected when a certain predetermined sequence of atomic events occurs. Each aggregate event 360 is thus composed of one or more atomic events 350 that conform to some predetermined pattern indicative of activity that should be monitored.

Specific types and/or sequences of atomic events 350 that lead to aggregate events 360 will be described in detail later. It should be appreciated here, however, that the particular events reported and their aggregation types depend upon the specific activities sought to be monitored.

In addition, predicates 370 that define enforcement policies are forwarded to the agent process 300. These may originate from configuration commands entered at management console 102-5 and be sent through the Digital Guardian server 104-2.

To protect the network completely, the agent process 300 would typically reside on all desktops 102 and file servers 104 associated with an enterprise's networks. The activity journaling server 104 and agent process 300 may communicate through secure, networking based applications such as the Microsoft ".NET" infrastructure or other secure networking systems. The management console 102-5 also permits access to the database stored in the Digital Guardian server 104-2, and is used specifically to provide risk compliance, forensic reporting, and similar reports 310 to administrative users of the system.

The journaling server 104-2 may typically run within a Windows 2000 Server environment having a secure .NET framework. The journaling server 104-2 also has access to a database, such as Microsoft SQL Server 2000 for example, to provide record storage and retrieval functions. It is to be understood, of course, that the processes described herein can be implemented on other types of operating systems, server platforms, database systems, and secure networking environments.

Figure 3:
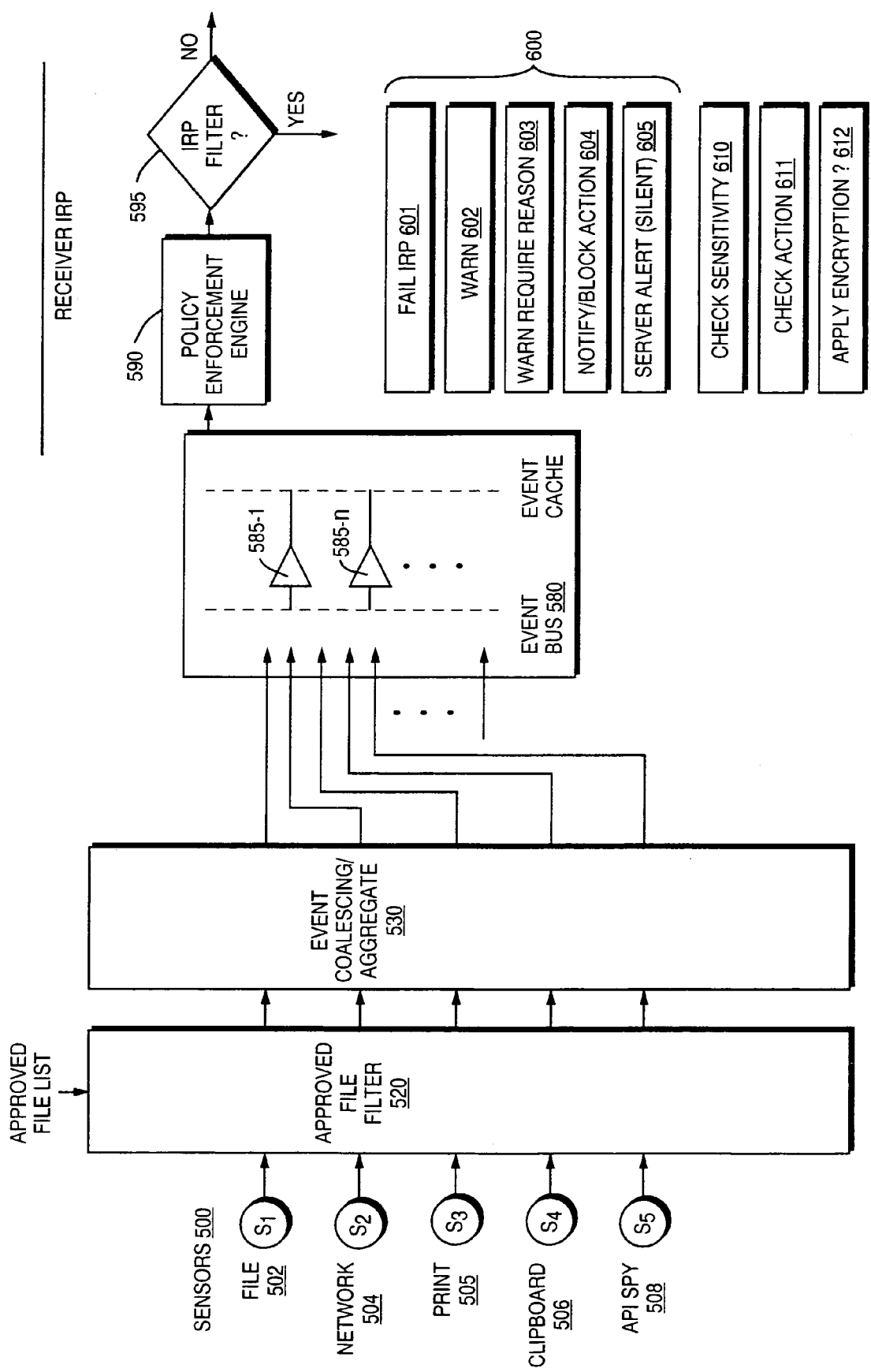
FIG. 3 is a process flow diagram illustrating the invention more particularly.

FIG. 3 is a more detailed view of the client agent 300. The elements of an agent 300 particularly consist of one or more sensors 500, file filter 520, and event coalescing/aggregation 530, event bus 580, one or more policy predicates 585, policy enforcement engine 590, and I/O Request Packet (IRP) filter 595. It should be further noted that the agent process 300 can also provide real time evaluation and potentially enforcement of rules.

The agent 300 preferably runs as a kernel process in a client Operating System (OS). For example, the agent 300 may run within the kernel of Microsoft Windows 2000 or Windows XP. Autonomous operation of the agent 300 provides for detection of atomic events 350 even when client 102 is disconnected from the network 100. Any such events are reported when the client 102 is reconnected and can communicate with the Digital Guardian server 104-2.

In a preferred embodiment, the agent 300 will run multiple services under Windows so that if one service is stopped by a malicious user, the other one may restart the other process. The process is also hid from a task manager or similar processes in the operating system and will be able to work with safe mode boot features in order to guarantee full protection.

Atomic event sensors 500 report atomic events as an output when actions, typically associated with Input/Output (I/O) drivers, are intercepted at the OS kernel. The agent process 300 is therefore transparent to the end user and tamper resistant. The intercept may, for example, occur during an I/O Request Packet (IRP) in an interruptible kernel. Events may also be provided by Windows services and kernel level drivers.

The sensors 500 may include file operation sensor 502 (including CD/DVD burn sensor 510), network operation sensor 504, print queue sensor 505, clipboard sensor 506, Application Programming Interface (API) spy sensor 508 and other sensors such as process spy 509.

Data collected with an event depends on the event type, but can include:

For invoked applications, the identity of the invoking process, executable name, start time, end time, and process owner For user operations, such as log on or log off, the time and user identification (ID)

For file operations, source/destination file name, operation type (open, write, delete, rename, move to recycle bin), device type, first and last access time For network operations, source/destination address, port and host names, start/end time stamp, bytes sent and received, inbound and outbound data transmission times For CD-RW operations, file names, start/end times and amount of data transferred For printing operations, full path or file name, event start time or print job name For clipboard operations, destination process ID, event start time, full path of filename involved For other high level operations, such as access to removable storage media, file name, device ID, time of day, bytes transferred, and the like An approved file filter 520 operates to automatically filter the dozens of inconsequential events generated by standard calls to system files. For example, it is quite common for many different .EXE and .DLL operating system files to be opened and accessed repeatedly in a typical executing Microsoft Windows application. In order to reduce the data flow to the journaling server 104-2, the file filter 520 uses an approved file list 522 to filter atomic (raw) sensor events 510.

The approved file list 522 may be implemented as a list of file names associated with events. However, in a preferred embodiment, the well known MD5 algorithm is used to generate a hash code for each file name. The MD5 hash code for a filename associated with an event is then matched against the approved list 522, rather than the complete file handle, to speed up the filtering process. Thus, only events associated with unapproved files are passed down to the coalescing stage 530.

The next stage is an atomic event coalescing stage 530 that attempts to aggregate atomic events 510. The coalescing stage 530 further filters atomic events 510 associated with or related to a single user action between the agent 300 and the Digital Guardian server 104. In general, applications frequently read small chunks of a file and not the entire file at the same time. For example, a user may open a 2 MegaByte (MB) spreadsheet file. However the OS may at a given time actually only access chunks of the spreadsheet file that are much smaller than that, such as 5 or 10 KiloBytes (KB) at a time. Thus, a typical pattern of access is to see a file open atomic event, followed by multiple read atomic events to the same file. If this sequence of atomic events is seen from the same process and the same executable with the same thread ID and the same file handle, event coalescing 530 will thus count only a single "FileOpen" event. In a preferred embodiment, there is a time attribute associated with event coalescing 530 such that if a time limit typically measuring in minutes of time is exceeded, at least one event will be reported between raw level events.

A comprehensive list of typical high level event patterns is shown in FIGS. 4A-4B. For example, 43 different action types, some of which are low level atomic events and others which are high level aggregate events, are defined in the preferred embodiment. A given event is composed of several fields in the database, including perhaps an action type 571, level 572, event category 573, event name 574, event table ID 575, action detail 576, action detail value 577, and discriminants 578.

Event categories are associated with each event type. For example, in an event category "file", event names include file read, file write, file rewrite, file copy, file rename, file delete, file move, file recycle, file restore. Similarly, network related events are TCP/IP inbound, TCP/IP outbound, USB inbound and so forth.

A scope is also associated with each event type. A scope is defined as either being a thread, process, login, machine, or all type scope. For example, "process" scope is an event that is consolidated into a high level event in the same process but not necessarily executing the same thread. "Machine" means that a reboot could occur between two events that occurred on the same machine.

Attributes commonly recorded for all high level events include an action type, an event count, bytes read count, bytes written count, event start, event end, and other possible actions. Source and destination hold numerous other attributes including the file, path, process, thread, and application identifying information that performed the event.

Other types of system events may include print events, disk write events, clipboard, user and machine events. The final type of low level event may be process events including process start and process end.

High level aggregate events are created by detecting a combination of the occurrence of low level events. More particularly, a high level aggregate event (action types 26-42) is determined after seeing a specific sequence of lower level events (action types 1-25). For example, action type 26 is a high level event called "FileEdited". This is an aggregate event that determines when a file has been edited. As the table indicates, the high level event aggregation process 570 may detect that a particular process, thread, and file has performed one or more reads to a particular file handle, followed by a write operation to the same process, thread and file handle. The event is then defined as an aggregate "File Edited" event.

Aggregate events are defined in greater detail in FIGS. 5A, 5B, 5C and 5D. For example, a "Clipboard to File" aggregate event 510 is defined as detecting a clipboard cut or copy followed by a clipboard paste to file operation.

Similarly, a "BurnFile" event is associated with detecting a CD write atomic event followed by a file read atomic event. Thus, if a series of file reads are detected from one file handle, followed by a series of CD write events with the same process, the application is recognized as having written a file to a CD-RW.

Numerous other aggregate events are possible; the list in FIGS. 5A, 5B and 5C is only meant to illustrate a few of the many possibilities.

An event bus 580 serves to distribute if one or more aggregate events to predicate rules 585-1, . . . , 585-n. An event cache 582 may also share events occurring during a certain time interval for use by the predicates 585. Events are thus fed to one or more predicates 585, which serve to implement policy logic. As one example of a predicate, logic might be implemented to encrypt all documents having a sensitivity level of "medium" or higher that are to be sent via block peer-to-peer file transfer applications. A predicate 585-n can thus be developed to detect a "network open" event followed by a "read hard disk drive" event, checking on the file sensitivity level. As mentioned previously, the code to implement predicates 585 is typically downloaded from the Digital Guardian server 104-2, such as driving a user 100 boot process.

Another example of a multi-event control predicate 585 would be to prevent files that originate from a specific server from being removed from that machine. This involves placing the files on a tracking list to watch for all derivative file re-names, copies, etc, and remembering these derivative names as well as the where a user first identifies source when removal actions are attempted.

When predicates 585-n are asserted, notification is then given to an encryption policy enforcement engine 590. The policy enforcement engine 590 then takes steps to enforce the desired policies at the point of use—that is, within the user kernel. One such enforcement mechanism may be via kernel IRP control. Thus, events that result in an IRP request may be intercepted by the kernel and examined by the policy enforcement engine 590. If the requested IRP does not require further action, then the policy enforcement engine 590, through the IRP filer 595, allows the requested action to proceed normally.

If the requested action potentially requires encryption according to the policy, then the policy engine 590 will take additional appropriate actions to control access to or even encrypt the files associated with the request.

Returning attention briefly to FIG. 3, then the policy enforcement engine 590 may then implement specific actions. If the requested access is itself a potential policy violation, then the policy engine 590 will take additional appropriate actions. A first action may simply have the OS fail the IRP, such as action 601. The user and/or application thus interpret this as a failure of the specific operating system service or hardware device implicated in the request.

However, other types of actions can take place. For example, the operating system may generate a usual warning to the user that the requested action violates policy. This can occur by sending a message but then allowing the request to continue, as in a warn action 602.

A warn-requiring-reason action 603 is similar, but also requires the user to provide input to document the reason for the policy violation.

In a notify-block action 604, the user is notified that the request violated a policy and the action is blocked.

Figure 6:
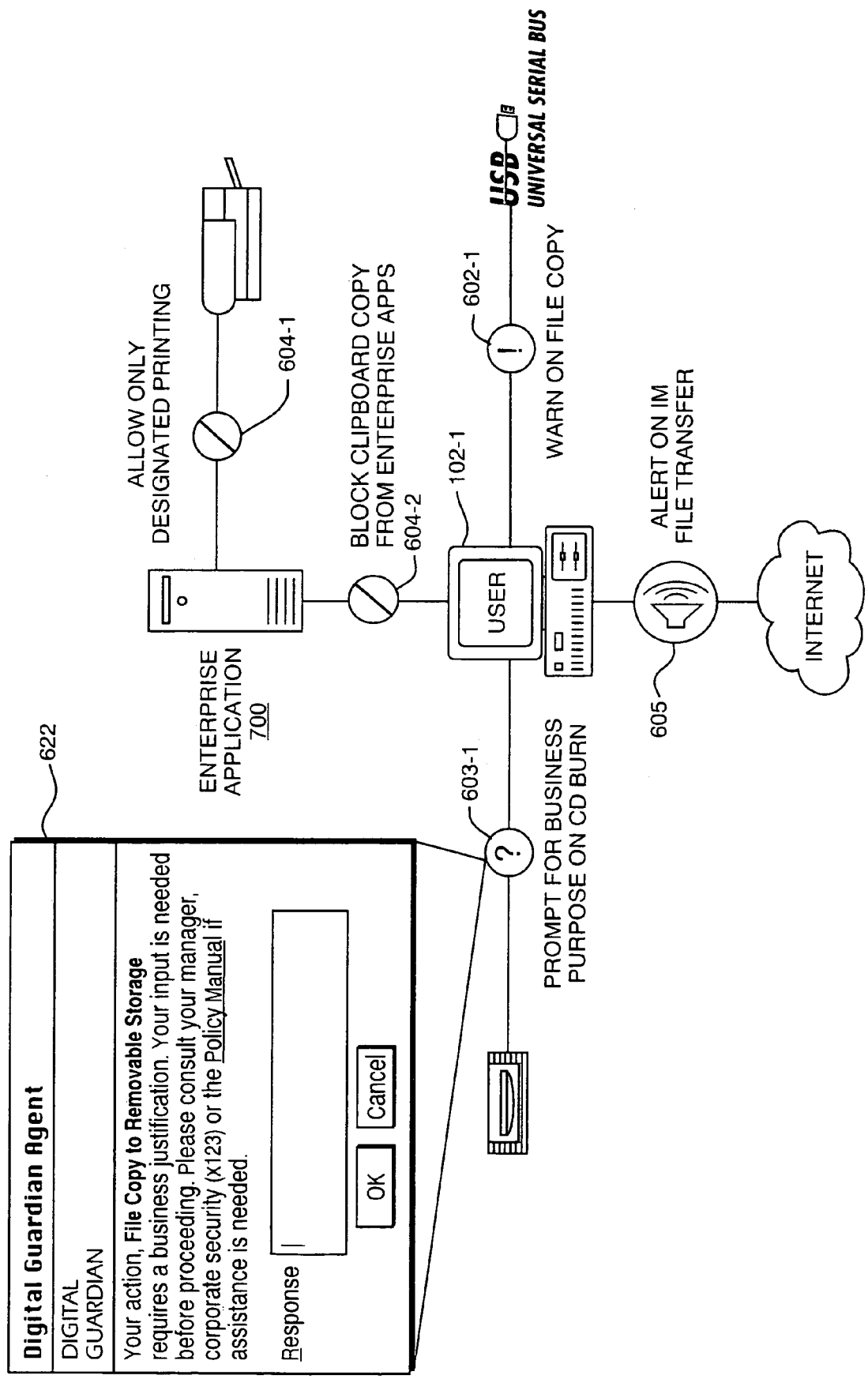
FIG. 6 illustrates point of use policy enforcement.

In a server alert action 605, an alert may be given to the journaling server 104-2 to indicate that the policy has been violated, providing additional information such as the identification of the user, the files involved and so forth. Details of these actions are shown in FIG. 6. For example, an enterprise policy may allow only designated types of printing to occur from a particular enterprise application 700. This policy is appropriately implemented with a notify-block action 604-1. The action 604-1 then blocks a requested print that falls outside of allowed policies.

Similarly, a block clipboard copy action 604-2 can be implemented to prevent clipboard copy operations from originating inside enterprise application 700.

A warn-on-file-copy action 602-1 has also been implemented which warns a user 102-1 when attempting to copy a file to a USB type device. The warn action 602-1 can send a message to the user but then allow the copy request to continue.

A policy may also be implemented to implement a warn-requiring-reason action 603-1 to prompt for a business purpose when a user attempts to burn a file to a CD. The action 603-1 causes a notice box 622 to be displayed at the user 102-1 requiring a response. Once the box is completed with a reason for the policy violation, the burn request is allowed to continue.

An alert action 605 may be implemented to control Instant Messaging (IM) file transfers. Here, information relating to the attempted activity can be provided to the journaling server 104-2 to indicate that the policy has been violated providing additional information, such as identification of the user, the files involved and so forth, in a way that is completely transparent to the user.

The actions taken may include a further sequence of steps to optionally implement encryption. As shown in FIG. 3 in a first step 610, the sensitivity of a file identifier associated with the action is determined. In a next step 611, the requested action type is determined. If the policy dictates that a file of the indicated sensitivity is to be encrypted for the indicated action (such as when a "medium" sensitivity file is to be transferred over a peer-to-peer network connection), then encryption is applied in step 612.

The manner of applying encryption is not critical to the present invention. For example, Public Key Infrastructure (PKI) or other known encryption schemes can be applied to encrypt the document. This is done by the agent process 300, operating in connection with the policy server 104 to perform any required digital signature, authentication, and/or key exchange required.

Figure 7:
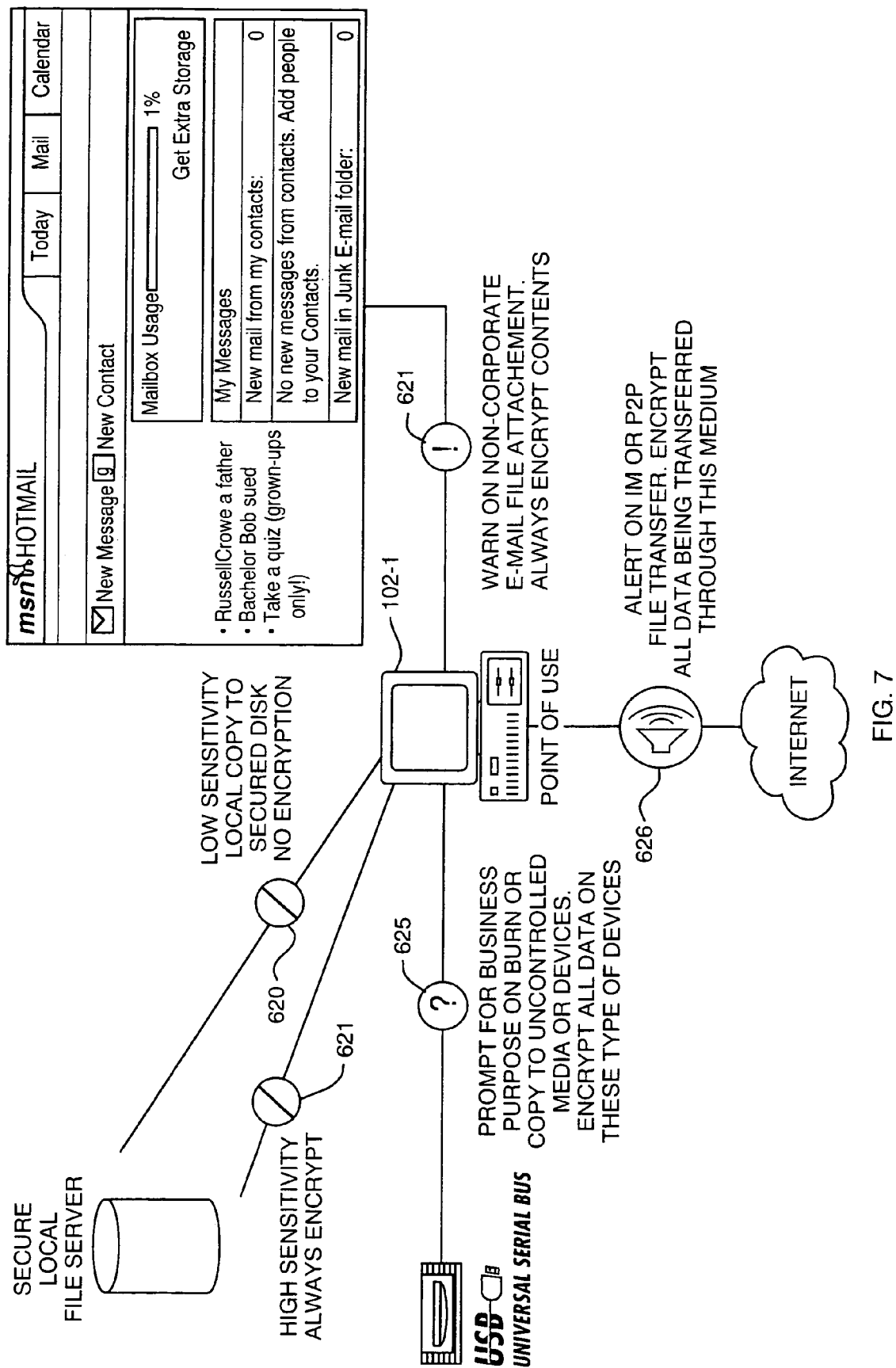
FIG. 7 illustrates point of use encryption policy enforcement.

FIG. 7 illustrates some of the possible encryption policies that can be implemented at the point of use. For example, if the associated file is "low" sensitivity, and the action is a "file copy", then applying 620 encryption policies may not require encryption, even when the file is to be copied to a removable CD ROM media. But when the file is "high" sensitivity, then a policy 621 may require that the file be encrypted, regardless of the action to be taken, e.g., even if the action is a low risk local copy action. A policy 622 may require that all files being attached to a non-enterprise email, such as to a "Hotmail" message, must be encrypted, regardless of sensitivity.

A high risk action, such as a copy to a USB memory device, with a high sensitivity file, would typically have a policy 625 that prompts for a business purpose and then requires encryption of the file. A still further policy 626, may always require encryption for IM file transfers, regardless of their sensitivity.

This process assures that any protected file moved outside of the organizations pint of use perimeter will only be found in encrypted form. This has important consequences in terms of preventing unauthorized use of digital assets as well as preventing false positives, that is, the incorrect denial of access to authorized users.

Figure 8:
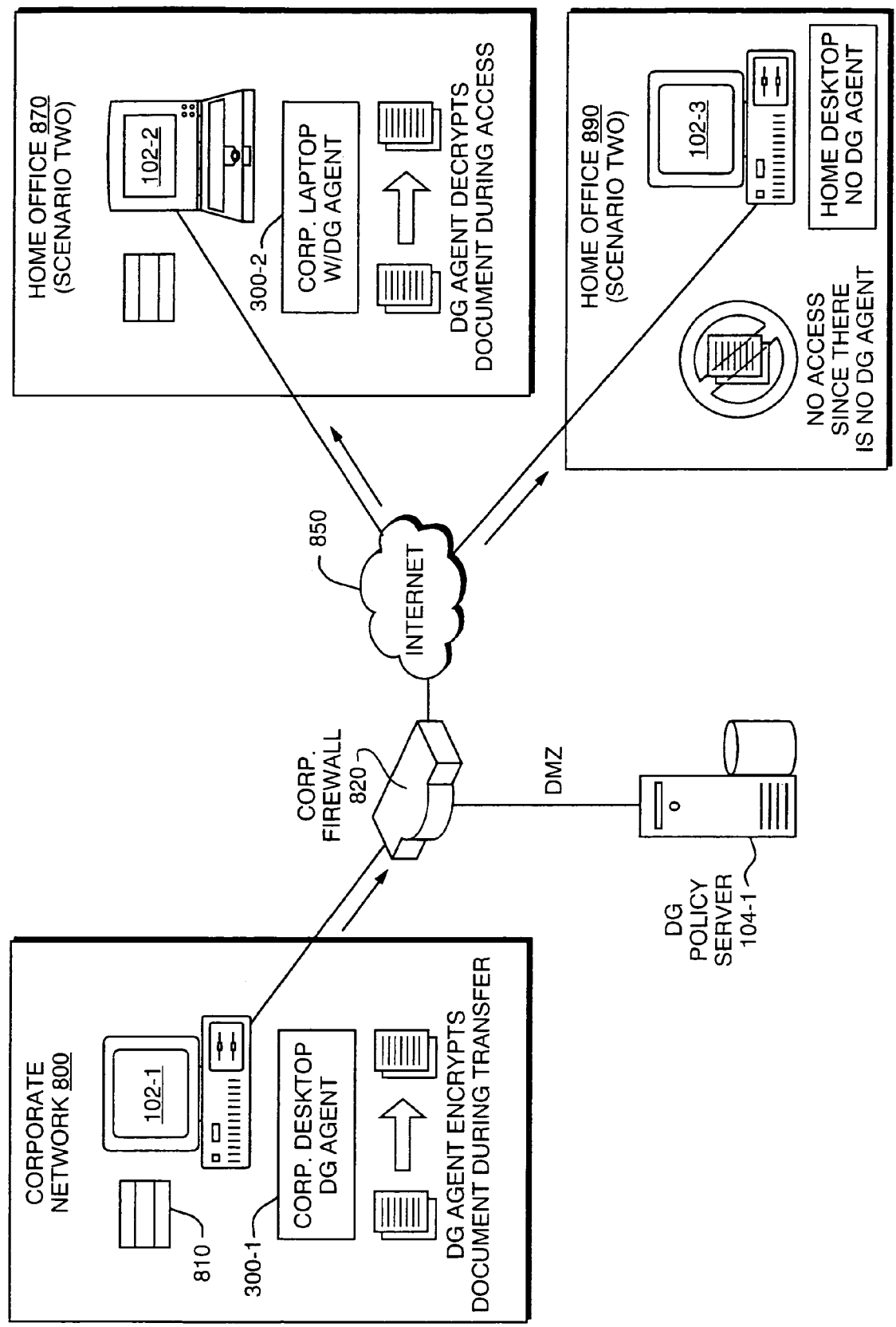
FIG. 8 illustrates how a document is handled at trusted and untrusted destinations.

Consider the typical situation as shown in FIG. 8. An enterprise has two or more locations, including at least a source location 800 and destination locations 870, 875. A policy server 104-1 is connected through a corporate firewall 820 via a demilitarized zone (DMZ) type connection. The policy server 104-1 is responsible for protecting the perimeter of use for files within its respective domain, such as may be associated with local area networks within specific facilities, as well as for implementing the encryption scheme in use by the enterprise. (It should be understood however, that there need not be a one-to-one correspondence between policy servers 104 and protected domains. That is, more than one location may be serviced by a single master policy sever 104-1 using known PKI networking protocols).

At the source location 800, a user 102-1 requests taking an action with a document 810, such as to transfer it over the Internet 850 as an e-mail attachment. The agent 300-1 at the source 800 intercepts this request and determines policies to apply as dictated by the policy server 104-1. The agent then selectively applies encryption to the document 810 before allowing it to be sent by e-mail.

In a first scenario (not shown in detail in FIG. 8), the document 810 is of low sensitivity and is not subjected to encryption. The e-mail is then permitted to proceed normally and the document arrives at the intended destination location 870 and specifically user 102-2 who was addressed in the e-mail. The document is thus accessible to the user 102-2 with no further intervention by the agent 300-2 at the destination, as it would be normally anyway.

The same result occurs if the e-mail is addressed to an untrusted location 890, such as another employee's home office, which is outside of the perimeter of the enterprise. The attached document will arrive unencrypted at user 102-3, as it would have normally anyway, without the existence of policy server 104-1.

In a second scenario (scenario two), the document 810 is of higher sensitivity, and the policy server 104-1 requires that the agent 300-1 encrypt the document 810. After encryption, the document 810 travels over the Internet, to the untrusted destination 890. Since there is no access to the PKI or other encryption infrastructure imposed in the enterprise at untrusted destination 890, then the document cannot be decrypted.

However, consider the result when the same encrypted document is sent to user 102-2 at the trusted destination 870. The e-mail is first intercepted by the agent 300-2 running in the OS kernel of the user 102-2. The agent 300-2 recognizes the file 810 as having been encrypted according to the enterprises' policy, such as by for example, examining a file header 812 that is inserted into the document at the time it was encrypted by agent 300-1 at the source 800. Having access to the PKI or other infrastructure in use via its associated policy server 104-1, the document 810 can then be decrypted and made available for use by the user 102-2.

If the encrypted document is sent to the untrusted destination 890, there is no associated possibility of access to an agent 300 or policy server 104 that understand how to handle the document 810, and it will remain encrypted.

Note that this scheme eliminates most of the risk of false positives. That is, if the agent 300-1 at the source 800 encrypts a document 810 that it probably should not have, no harm is done, since the agent 300-2 at the trusted destination 870 will decrypt the document without knowledge of either user 102-1 or 102-2 having known that the document was ever encrypted at all.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for controlling access to digital assets in a data processing environment comprising:
    an encryption policy server, for storing one or more asset encryption policies to be applied to a security perimeter, the security perimeter comprising two or more data processing assets;
    an atomic level data processing asset access event sensor, located within an operating system kernel within an end user device to sense atomic level events at a point of authorized access by the end user device to one or more digital assets;
    an aggregator, to aggregate multiple atomic level events to determine if a group of two or more asset access events has occurred; and
    an encryptor, to assert an asset encryption policy if a group of asset access events has occurred that indicates a risk of use of a digital asset outside the security perimeter.

2. An apparatus as in claim 1 wherein the encryptor additionally asserts at least one of the asset encryption policies by encrypting an associated digital asset.

3. An apparatus as in claim 1 wherein the group of asset access events is a time sequence of multiple atomic level events.

4. An apparatus as in claim 1 that operates independently of application software executing on the end user device.

5. An apparatus as in claim 1 wherein the sensor, aggregator, and encryptor operate in real time.

6. An apparatus as in claim 1 wherein a sensitivity of a particular digital asset is also sensed by the asset access event sensor, and the encryptor additionally comprises:
    an adaptive encryptor, for adaptably encrypting the digital asset, optionally depending upon the sensitivity of the particular digital asset.

7. An apparatus as in claim 1 additionally wherein the encryptor is located:
    at the end user device, to apply the encryption policy specified to the digital asset.

8. An apparatus as in claim 7 additionally comprising:
    a transmitter, for sending the digital asset to a second end user device; and
    an encryptor, to apply the encryption policy at the second end user device.

9. An apparatus as in claim 8 additionally comprising:
    a decryptor, to decrypt the digital asset at the second end user device.

10. An apparatus as in claim 7 additionally comprising:
    a transmitter, for forwarding the digital asset to a second end user device; and an encryptor, which does not assert an encryption policy at the second end user device, so that if the encryption policy specifies encryption, the digital asset cannot be read at the second end user device.

11. An apparatus as in claim 1 wherein the digital assets are application level data files to which the end user device has read and write access within the security perimeter.

12. An apparatus as in claim 1 wherein the operating system kernel of the end user device receives the stored digital asset encryption policies from the policy server over a secure network connection.

13. An apparatus as in claim 1 wherein the encryptor is implemented in an operating system kernel of the end user device.

14. An apparatus as in claim 13 wherein the group of access events includes a first file open event, followed by a clipboard copy operation, a second file open event, and a file transmit through network communication point event.

15. An apparatus as in claim 1 wherein:
the sequence of digital access events indicates that the end user device is attempting to store a copy of the digital asset, and
at least one digital asset encryption policy specifies whether the digital asset is to be encrypted or not, depending upon a type of storage device on which the end user device is attempting to store a copy.

16. An apparatus as in claim 15 wherein the encryption policy specifies that the digital asset is not to be encrypted when the type of storage device is a local file server.

17. An apparatus as in claim 15 wherein the encryption policy specifies that the digital asset is to be encrypted when the type of storage device is a removable media storage device.

18. An apparatus as in claim 1 wherein:
the group of access events indicates that the end user device is sending the digital asset through a network communication port; and
the encryption policy further specifies that the digital asset is to be encrypted, prior to sending the digital asset through the network communication point.

19. An apparatus as in claim 18 wherein the group of access events indicates that the end user device is attaching the digital asset to one of an electronic mail message or instant messaging service.

20. An apparatus as in claim 1 wherein:
one of the encryption policies specifies that encryption is to be applied to an asset when a particular time sequence of access events is sensed; and
another of the encryption policies specifies that encryption is not to be applied to an asset when another particular time sequence of access events is sensed.

* * * * *